United States Patent [19]

Krämer

[11] 4,234,480
[45] Nov. 18, 1980

[54] WATER-SOLUBLE AZO DYESTUFFS

[75] Inventor: Erich Krämer, Bergisch-Gladbach, Fed. Rep. of Germany

[73] Assignee: Bayer Aktiengesellschaft, Leverkusen, Fed. Rep. of Germany

[21] Appl. No.: 936,493

[22] Filed: Aug. 24, 1978

[30] Foreign Application Priority Data

Aug. 26, 1977 [DE] Fed. Rep. of Germany ....... 2738510

[51] Int. Cl.³ ............................................. C09B 29/22
[52] U.S. Cl. ..................................... 260/157; 260/158
[58] Field of Search ................................. 260/157, 158

[56] References Cited

U.S. PATENT DOCUMENTS

| 3,274,171 | 9/1966 | Anderson et al. | 260/158 |
| 4,001,206 | 1/1977 | Schoefberger | 260/158 |

FOREIGN PATENT DOCUMENTS

| 2251041 | 4/1973 | Fed. Rep. of Germany | 260/158 |
| 2451257 | 5/1976 | Fed. Rep. of Germany | 260/157 |
| 1351276 | 4/1974 | United Kingdom | 260/157 |

Primary Examiner—Helen M. S. Sneed
Attorney, Agent, or Firm—Sprung, Felfe, Horn, Lynch & Kramer

[57] ABSTRACT

The application relates to new azo dyestuffs which, in the form of the free acid, correspond to the general formula

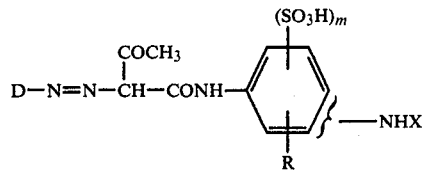

in which
D, R, m and X have the meaning indicated in the description, their preparation and their use for dyeing and printing cellulose-containing materials, in particular paper and cotton.

4 Claims, No Drawings

WATER-SOLUBLE AZO DYESTUFFS

The invention relates to new azo dyestuffs which, in the form of the free acid, correspond to the general formula

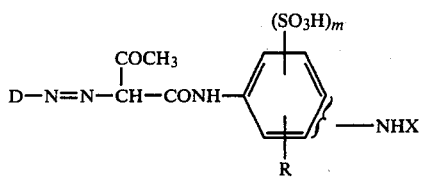

in which
X denotes hydrogen, benzoyl, maleoyl or a radical of the formula

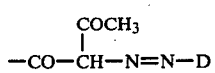

D denotes a radical of the formulae

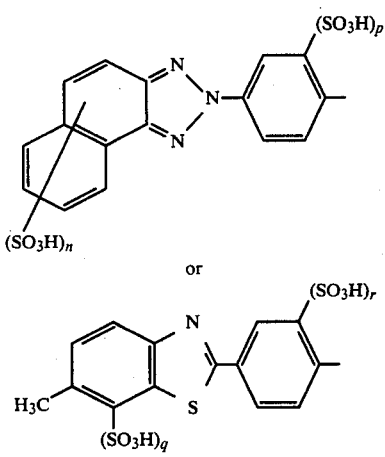

R denotes hydrogen, methyl, ethyl, methoxy, ethoxy or chlorine,
m, p, q and r denote 0 or 1 and
n denotes 1 or 2,
with the proviso that the dyestuffs contain at least 2 sulphonic acid groups, their preparation and their use for dyeing and printing cellulose-containing materials, in particular paper and cotton.

In the form of the free acid, preferred dyestuffs correspond to the formula

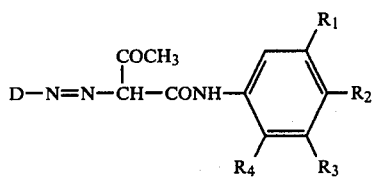

wherein
(a) $R_1=SO_3H$, $R_2=NHX$, $R_3=R_4=H$,
(b) $R_1=R_4=H$, $R_2=SO_3H$, $R_3=NHX$, or
(c) $R_1=SO_3H$, $R_2=H$, $R_3=NHX$, $R_4=CH_3$, and
D and X have the meaning already given.

Particularly preferred dyestuffs are those in which the NHX group is in the p-position relative to the carboxamido group.

With respect to D, those dyestuffs within the invention which contain the benzthiazole radical as indicated above are preferred.

With respect to X, those dyestuffs within the invention which contain a second

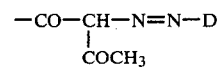

group in the dyestuff molecule are preferred.

The dyestuffs according to the invention are obtained by a process in which diamines of the formula

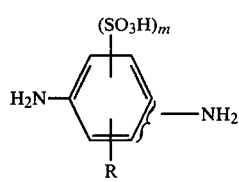

in which
R and m have the meaning already given,
are acylated once or twice with diketene and the products are then coupled once or twice with a diazotised amino compound of the formula $$D-NH_2 \qquad (IV)$$

in which
D has the meaning indicated in formula (I).

Examples of suitable diamino compounds of the formula (III) are 1,4-diaminobenzene, 1,3-diaminobenzene, 4-chloro-1,3-diaminobenzene, 2-chloro-1,4-diaminobenzene, 1,4-diamino-2-methylbenzene, 1,3-diamino-2-methylbenzene, 1,3-diamino-4-methoxybenzene, 1,4-diamino-2-methoxybenzene, 2,5-diaminobenzenesulphonic acid, 2,4-diaminobenzenesulphonic acid, 2,4-diamino-5-methylbenzenesulphonic acid, 2,5-diamino-4-methoxybenzenesulphonic acid and 3,5-diamino-4-methylbenzenesulphonic acid.

Examples of suitable diazo components of the formula (IV) are 2-(4-aminophenyl)-6-methyl-7-benzthiazolesulphonic acid, 2-(4-amino-3-sulphophenyl)-6-methyl-7-benzthiazolesulphonic acid, 2-(4-aminophenyl)-naphtho[1,2-d]-triazole-6-sulphonic acid and 2-(4-amino-3-sulphophenyl)-naphtho[1,2-d]-triazole-4,7-disulphonic acid.

The new dyestuffs are suitable for dyeing and printing cellulose fibre materials, in particular paper and cotton. The dyeings are particularly clear and have good fastness properties. The new dyestuffs can be processed to give concentrated stable solutions which can be advantageously employed in paper-dyeing. The concentrated solutions can be particularly easily obtained by reacting the diazotised amines IV with concentrated aqueous solutions containing acetoacetylaminoarylsulphonic acid salts of the formula

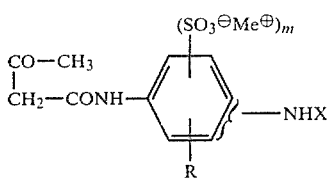 (V)

wherein

R, X and m have the meaning already given and

Me denotes a protonated, tertiary, hydrophilising nitrogen base, a quaternary, hydrophilising ammonium cation or the lithium cation.

Preferred suitable tertiary, hydrophilising nitrogen bases are those of the formula

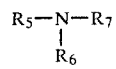 (VI)

wherein $R_5$ denotes hydroxyalkyl, alkoxyalkyl or a radical of the formula

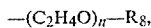

$R_6$ and $R_7$ denote alkyl, hydroxyalkyl, alkoxyalkyl or a radical of the formula

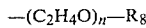

or together with the N atom form a saturated 5-membered or 6-membered heterocyclic ring, $R_8$ denotes hydrogen or alkyl and n denotes an integer from 2 to 10.

Preferred suitable quaternary, hydrophilising ammonium cations are those of the formula

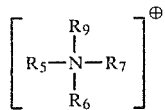 (VII)

wherein $R_5$, $R_6$ and $R_7$ have the meaning already given and $R_9$ has the meaning of $R_2$ or $R_3$.

Suitable heterocyclic rings are pyrrolidine, piperidine, morpholine or piperazine.

Within the formulae (VI) and (VII), those compounds in which the alkyl and alkoxy radicals mentioned contain 1 to 4 C atoms are preferred.

Examples which may be mentioned are: triethanolamine, tris-[2-(2-hydroxyethoxy)-ethyl]-amine, tris-propanol- or -isopropanol-amine, dimethyl- or diethyl-ethanolamine, N-hydroxyethylpiperidine or N-hydroxyethylmorpholine.

Examples of suitable quaternary ammonium bases are trimethyl-(2-hydroxyethyl)-, dimethyl-bis-(2-hydroxyethyl)-, methyl-tris-(2-hydroxyethyl)- or tetra-(2-hydroxyethyl)-ammonium hydroxide.

Lithium hydroxide, carbonate or bicarbonate are advantageously employed as basic lithium salts.

The bis-coupled dyestuffs are particularly suitable for dyeing cotton fibres in the presence of quaternary epoxyammonium compounds by the process indicated in Textilveredelung 5, 1970, pages 829 to 838. The dyestuffs then exhibit particularly good fastness to wet processing on cotton fabric.

EXAMPLE 1

18.8 g (0.1 mol) of 2,5-diaminobenzenesulphonic acid are stirred in 140 ml of water. 9.4 g (0.112 mol) of freshly distilled diketene are added dropwise at a temperature of 35° C. in the course of 3½ hours and the pH is kept at 3.5 by adding sodium hydroxide solution.

This gives a solution of the compound of the formula

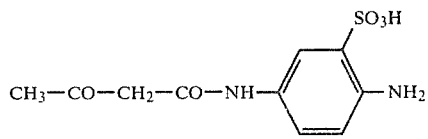

in the form of the Na salt.

EXAMPLE 2

18.8 g (0.1 mol) of 2,5-diaminobenzenesulphonic acid are stirred in 140 ml of water. 18.8 g (0.224 mol) of freshly distilled diketene are added dropwise at a temperature of 35° C. in the course of 3½ hours and the pH is simultaneously kept at 3.5 by adding sodium hydroxide solution.

This gives a solution of the compound of the formula

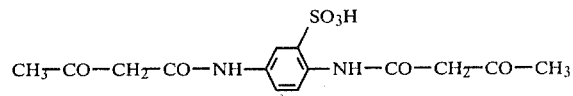

in the form of the Na salt.

The following diaminobenzenesulphonic acids can be selectively acetoacetylated analogously to Example 1: 2,4-diaminobenzenesulphonic acid, 2,4-diamino-5-methylbenzenesulphonic acid and 2,5-diamino-4-methoxybenzenesulphonic acid. If bases other than sodium hydroxide solution are used for to buffer, the salts corresponding to the particular base are obtained. The corresponding ammonium salts are obtained with tertiary amines or quaternary ammonium hydroxides.

EXAMPLE 3

64 g (0.2 mol) of 2-(4-aminophenyl)-6-methyl-benzthiazole-7-sulphonic acid are dissolved at pH 10 in 900 ml of water, and 13.8 g (0.2 mol) of sodium nitrite are added. The solution is allowed to run into a mixture of 70 ml of water, 55 ml of hydrochloric acid (of °Be strength 19.5) and 0.1 g of sodium nitrite. The resulting suspension is further stirred for one hour and excess nitrous acid is then destroyed with amidosulphonic acid. The finished diazotisation product is combined with the solution obtained according to Example 2 and the pH is adjusted to 5 with sodium hydroxide solution and this value is maintained until the coupling reaction has ended. 120 g of sodium chloride are added, after 30 minutes the dyestuff is isolated and the resulting paste is then dried. The dyestuff has the formula

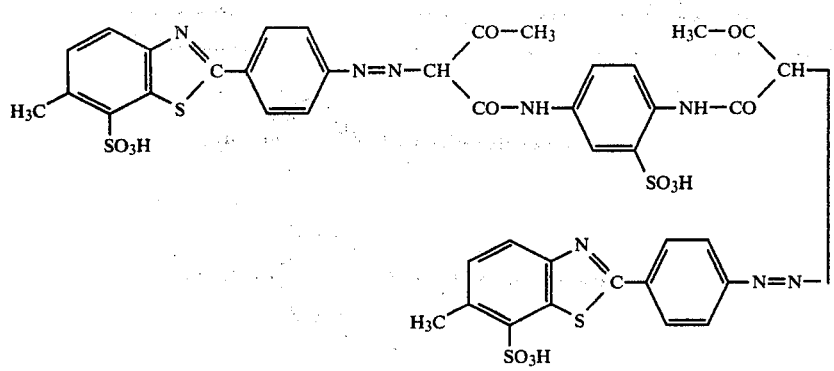

and dyes paper as well as cotton in greenish-tinged yellow shades.

EXAMPLE 4

If the procedure followed is as in Example 2 and during the preparation of the coupling component the mixture is buffered with tris-[2-(hydroxy-ethoxy)-ethyl]-amine instead of sodium hydroxide solution, the corresponding ammonium salt of the coupling component is obtained. If the isolated diazotisation product from Example 3, which has been rinsed with acidified water, is introduced into this solution, after diluting with 200 ml of water and coupling at pH 5, the mixture having been buffered with tris-[2-(hydroxy-ethoxy)-ethyl]-amine, a stable, concentrated dyestuff solution containing the dyestuff of the formula from Example 3 is obtained, which can be advantageously employed in paper dyeing.

EXAMPLE 5

If 0.1 mol of the diazotisation product obtained according to Example 3 is added to the coupling component obtained according to Example 1 and coupling is carried out as described in Example 3, after salting out and isolating and drying the product, the dyestuff of the formula

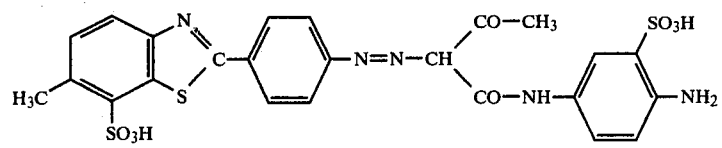

is obtained. It dyes paper in brilliant yellow shades.

The dyestuffs listed in the following table can be prepared analogously to Example 3 or Example 5.

| Example | Diazo Component | Coupling component | Shade |
|---|---|---|---|
| 6 | ![diazo] | $CH_3-CO-CH_2-CO-NH-$ phenyl with $SO_3H$, $NH_2$ | yellow |
| 7 | " | phenyl with two $NH-CO-CH_2-CO-CH_3$ groups and $SO_3H$ | " |
| 8 | ![diazo] | " | " |

| Example | Diazo Component | Coupling component | Shade |
|---|---|---|---|
| 9 | " | CH₃—CO—CH₂—CO—NH—⟨C₆H₃(SO₃H)⟩—NH₂ | " |
| 10 | " | CH₃—CO—CH₂—CO—NH—⟨C₆H₂(SO₃H)(OCH₃)⟩—NH₂ | " |
| 11 | " | H₃CO—⟨C₆H₂(SO₃H)⟩(NH—CO—CH₂—CO—CH₃)₂ | " |
| 12 | " | HO₃S—⟨C₆H₂(CH₃)⟩(NH—CO—CH₂—CO—CH₃)₂ | " |
| 13 | " | CH₃—CO—CH₂—CO—NH—⟨C₆H₃(SO₃H)⟩—NH₂ | " |
| 14 | ⟨naphthotriazolium: SO₃H, HO₃S, N=N⊕—C₆H₄—NH₂, N⊖⟩ | CH₃—CO—CH₂—CO—NH—⟨C₆H₃(SO₃H)⟩—NH₂ | " |
| 15 | ⟨H₃C—benzothiazole(SO₃H)—C₆H₃(SO₃H)—NH₂⟩ | CH₃—CO—CH₂—CO—NH—⟨C₆H₃(SO₃H)⟩—NH₂ | " |
| 16 | " | H₃C—CO—CH₂—CO—NH—⟨C₆H₃(SO₃H)⟩—NH₂ | " |
| 17 | " | ⟨C₆H₃(SO₃H)⟩(NH—CO—CH₂—CO—CH₃)₂ | " |
| 18 | " | HO₃S—⟨C₆H₂(CH₃)⟩(NH—CO—CH₂—CO—CH₃)₂ | " |

| Example | Diazo Component | Coupling component | Shade |
|---|---|---|---|
| 19 | 2-(4-aminophenyl)-6-methyl-7-sulfo-benzothiazole | 4-(acetoacetylamino)-2-amino-5-methylbenzenesulfonic acid (SO₃H, NH₂, CH₃, NHCOCH₂COCH₃ substituents) | " |
| 20 | " | 4-(acetoacetylamino)-2-amino-5-methoxybenzenesulfonic acid | " |
| 21 | " | 1,4-bis(acetoacetylamino)-2-methoxy-5-sulfobenzene | " |
| 22 | " | 4-(acetoacetylamino)-2-aminobenzenesulfonic acid | " |
| 23 | 2-(4-amino-3-sulfophenyl)-6-methyl-7-sulfo-benzothiazole | 1,4-bis(acetoacetylamino)benzene | " |
| 24 | 2-(4-amino-3-sulfophenyl)-6,8-disulfo-naphtho[1,2-d]triazolium | 1,4-bis(acetoacetylamino)benzene | " |
| 25 | 2-(4-aminophenyl)-6-methyl-7-sulfo-benzothiazole | 2-sulfo-1-(acetoacetylamino)-4-(maleylamino)benzene (NH-CO-CH=CH-COOH) | " |
| 26 | 2-(4-amino-3-sulfophenyl)-6-methyl-7-sulfo-benzothiazole | 2-sulfo-1-(acetoacetylamino)-4-(C₅H₆-carbonylamino)benzene | " |

DYEING EXAMPLE

The dyeing of paper and cotton using the new dyestuffs is carried out under the customary conditions which are generally known. Applying the process, cited on page 6, of M. Rupin, G. Veaute and J. Balland, the procedure is as follows:

10 g of the dyestuff from Example 8 are dissolved in 1 l of water at room temperature, together with 2 g of a commercially available padding auxiliary consisting of sodium di-(2-ethylhexyl)-phosphate, ethylene glycol and water, 30 g of the compound of the formula

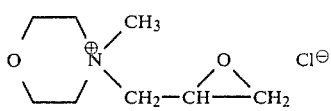

and 15 ml of sodium hydroxide solution (°Be strength 38). The liquor is then padded onto cotton at a liquor pick-up of 80%. The fabric is stored at room temperature for 16 hours, packed in a water-tight container for protection against evaporation. Thereafter, the fabric is rinsed in the cold and under the influence of heat and soaped at the boil. The resulting dyeing has fastness to wet processing which fulfil the highest requirements.

I claim:

1. Azo dyestuffs which, in the form of the free acid, correspond to the general formula

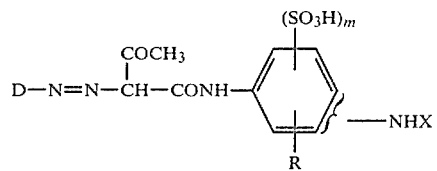

in which

X denotes a radical of the formula

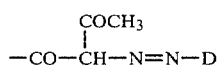

D denotes a radical of the formulae

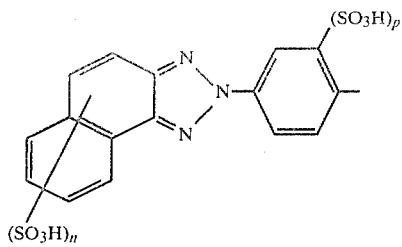

or

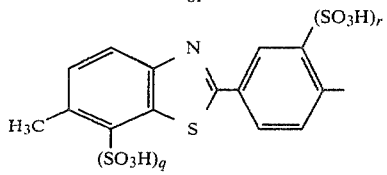

R denotes hydrogen, methyl, ethyl, methoxy, ethoxy or chlorine,
m, p, q and r denote 0 or 1 and
n denotes 1 or 2,
with the proviso that the dyestuffs contain at least 2 sulphonic acid groups.

2. Process for the preparation of dyestuffs according to claim 1, characterised in that diamines of the formula

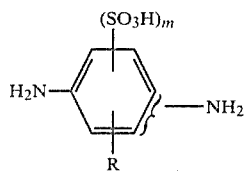

in which
R and m have the meaning given in claim 1, are acylated twice with diketone and the products are then coupled twice with a diazotised amino compound of the formula

D—NH$_2$ in which
D has the meaning indicated in claim 1.

3. Concentrated aqueous solutions of the dyestuffs according to claim 1.

4. Concentrated solutions according to claim 3, in which the dyestuffs contain, as cations, a protonated, tertiary, hydrophilising nitrogen base, a quaternary, hydrophilising ammonium cation or the lithium cation.

* * * * *